(No Model.)  3 Sheets—Sheet 1.

J. W. SUTTON.
PROCESS OF AND APPARATUS FOR REMOVING WATER HAIRS FROM SEAL AND OTHER FURS.

No. 308,932. Patented Dec. 9, 1884.

WITNESSES:
Rudolf Kjellman
John H. Fisher

INVENTOR
John W. Sutton
BY James A. Whitney
ATTORNEY (No Model.) 3 Sheets—Sheet 2.
J. W. SUTTON.
PROCESS OF AND APPARATUS FOR REMOVING WATER HAIRS FROM SEAL AND OTHER FURS.

No. 308,932. Patented Dec. 9, 1884.

WITNESSES:

INVENTOR
John W. Sutton
BY James A. Whitney
ATTORNEY

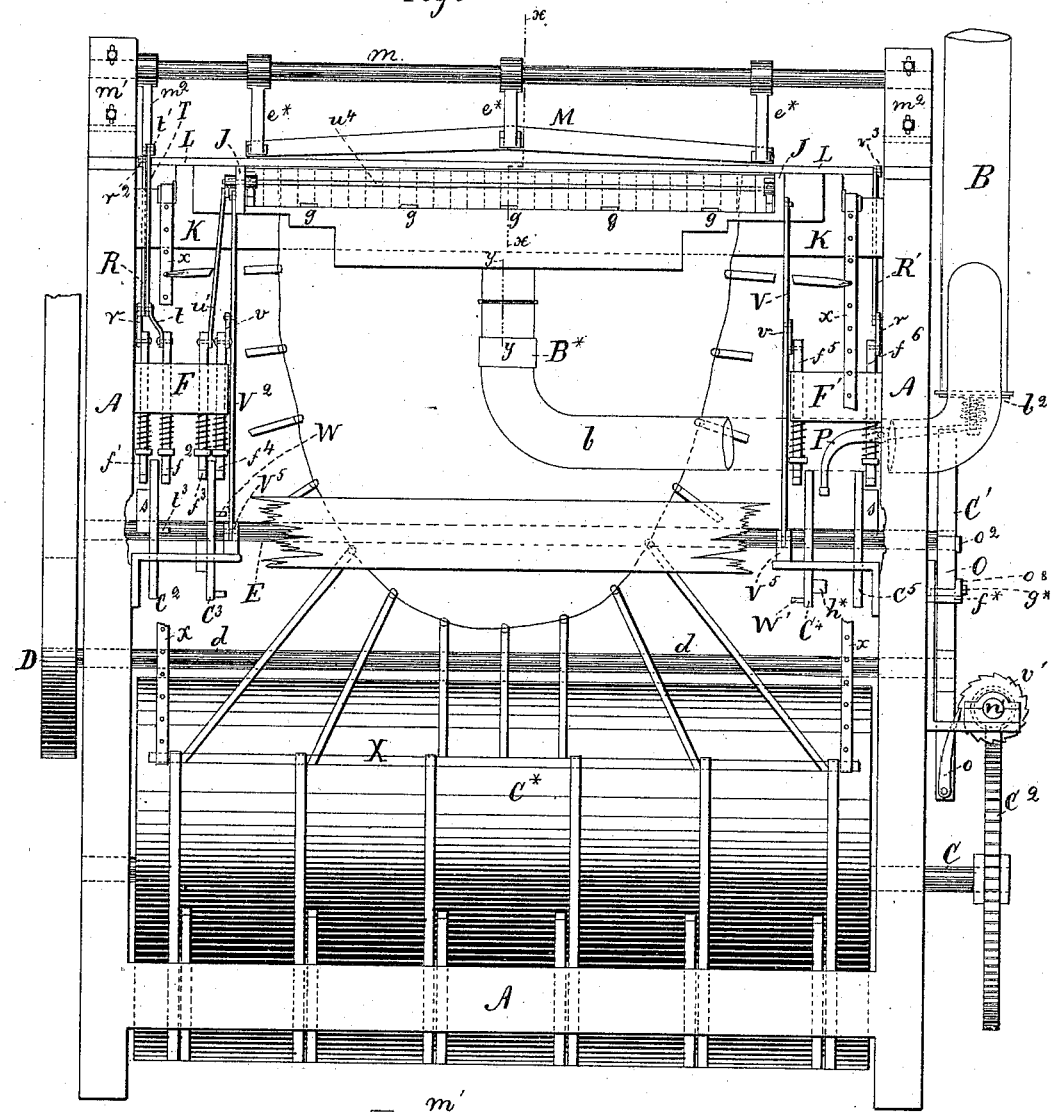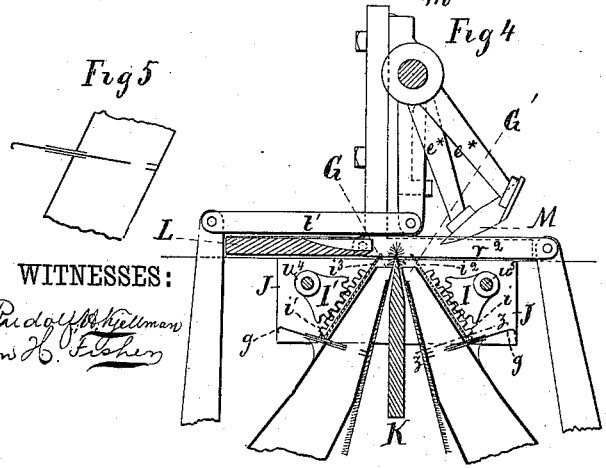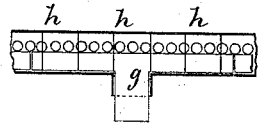

United States Patent Office.

JOHN W. SUTTON, OF NEW YORK, N. Y.

PROCESS OF AND APPARATUS FOR REMOVING WATER-HAIRS FROM SEAL AND OTHER FURS.

SPECIFICATION forming part of Letters Patent No. 308,932, dated December 9, 1884.

Application filed January 18, 1884. (No model.)

*To all whom it may concern:*

Be it known that I, JOHN W. SUTTON, of the city, county, and State of New York, have invented certain Improvements in Process of and Apparatus for Removing Water-Hairs from Seal and other Furs, of which the following is a specification.

This invention relates to the removal of the so-called "water-hairs" from seal-skins and other furs; and its object is to provide efficient, reliable, and comparatively inexpensive means for effecting the removal of said water-hairs without injury to the skin or fur, and with material economy in the matter of labor and skilled supervision in the operation.

My invention comprises certain novel methods and combinations of parts whereby said object is fully accomplished.

Figure 1:
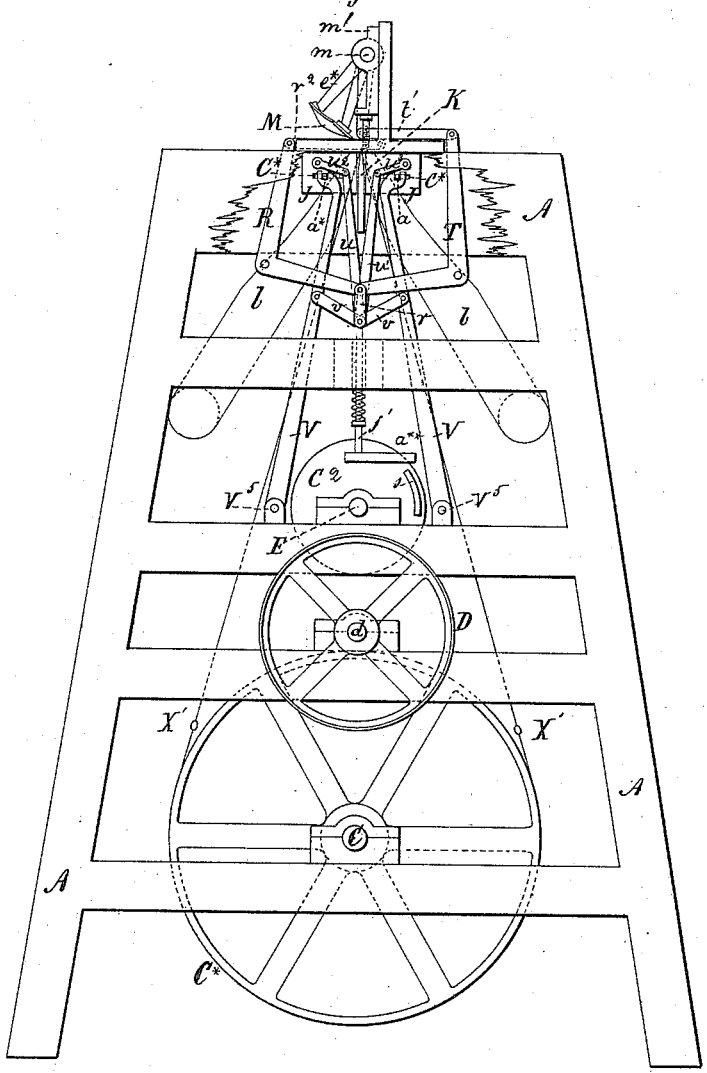
Figure 2:
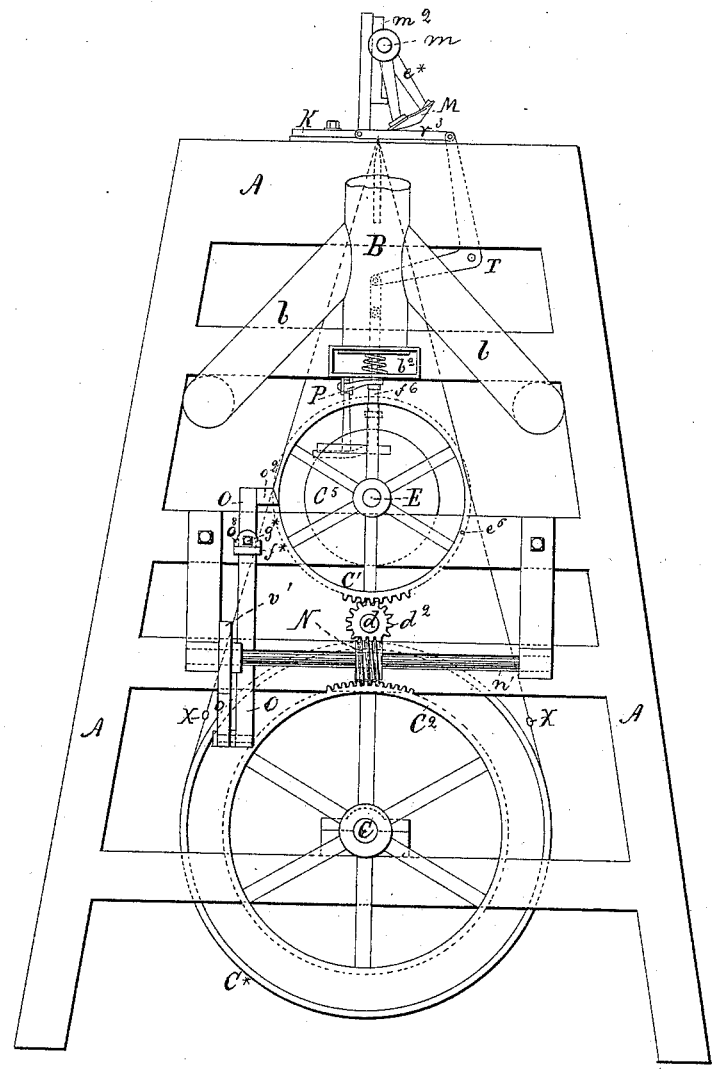

Figure 1 is an end elevation of an apparatus embodying my said invention. Fig. 2 is a like view of the opposite end of said apparatus. Fig. 3 is a front elevation of the same. Fig. 4 is a vertical transverse sectional view, taken in the line $xx$ of Fig. 3, of certain parts of said apparatus. Figs. 5 and 6 are detached detail views of other parts of said apparatus.

I will first describe the construction of said apparatus and then the operation of the same.

A is the stationary frame of the apparatus.

B is an exhaust air-pipe connected with an exhaust-fan arranged in any convenient position and location. Shown at $bb$ are branch exhaust-pipes connected to suction-mouths G G' by flexible joints B*.

D is a belt-pulley, through and from which power is transmitted to the machine. At $d$ is a driving-shaft.

$d^2$ is a small gear-wheel that meshes into a large gear-wheel, C', on a cam-shaft, E. (Shown at $C^2$.)

$C^3$, $C^4$, and $C^5$ are cam-wheels fast upon the shaft E.

F and F' are guides, through which move vertically the square stems of the lifter-bars $f'$, $f^2$, $f^3$, $f^4$, $f^5$, and $f^6$. The lower end of each of the lifter-bars is formed with arms $a^{\times\times}$, so that the projections upon the cam-wheel when they engage the arms gives to the lifter-bar an upward movement, the return movement of said bar being given by a spiral spring, $b^*$, placed around the stem of each lifter-bar below the guide in which it works.

G and G' are the suction-mouths. Those extend the length of the narrow edge of the stretcher-bar K. Shown at $g\,g\,g\,g$ are slides that cover the openings in the bottom of the suction-mouths G G', so as to admit the graduated quantity of air at any part of the suction-mouth required to insure the sucking down of the fur and to leave the water-hairs standing.

Shown at $h\,h\,h$ are partitions that extend from above the slides $g\,g\,g$ nearly to the top of the suction-mouths, that force the air to come into the mouths past the fur in every part alike in quantity as the openings $g\,g\,g$ demand. The inner lips of the suction-mouths are shorter than the outer edges, so that as they close against the skin from which the water-hairs are to be taken they do not touch the ends of the fur that is being acted upon.

I I' are cogged quadrants or toothed sectors, which mesh into the racks $i\,i'$, these latter being fastened to the slides $i^2$ and $i^3$, which move up and down upon the outside of the suction-mouths and guide the current of air at certain requisite times into and upon the fur and hair of the skin.

J are angle-pieces attached to the stretcher-bar K, in which are slots $C^*$, which constitute ways in which projections $a^*$, attached to the suction-mouths, slide backward and forward.

L is a straight-edged knife, the edge being of the same length as the narrow edge of the stretcher-bar K, and which has a movement forward and backward, the edge being arranged in such distance above the edge of the stretcher-bar as to cut off the hairs and leave the stumps as short as possible.

M is a swinging knife, hung upon a shaft, $m$, by means of three arms, $e^*$. The edge of this knife is arranged in substantially what, for convenience of description, may be termed a "tangent" to the axes of movement of said knife, and is slightly V-shaped—that is to say, it is an obtuse angle the apex of which is in the center, and the height is about one and one-half inch, and is as if cut from the surface of a cylinder of the length of the knife, and the radius of the edge of the knife in cutting the outer ends first touch the edge of the straight knife and cut then toward the center. The hairs on the edges of seal-skins do not point directly backward, but backward and outward, and this form of knife lifts or straightens up these hairs preparatory to cutting them. The shaft $m$ is hung in adjustable bearings $m'$ $m^2$.

Upon the end of the drum-shaft C is a worm-wheel, $C^2$, into which meshes a worm, N, that is upon the shaft $n'$. Upon this shaft is a ratchet-wheel, $v'$, that is actuated by the pawl $o$, that is hung upon the lower end of the feed-bar O, that slides through guides $f^\times$, attached to the frame A. Upon the upper end of O is a projection, $o^2$, which extends over the side face of the large gear-wheel C', upon the side face of which latter is a projecting pin, $e^6$, so that when the said wheel revolves said pin engages with the projection $o^2$, lifting the feed-bar O with the pawl $o$, and moving the ratchet-wheel a definite distance, and by the worm-gear moving the drum and with it the skin over the stretcher-bar.

$O^8$ is a collar, that is held in place by a set-screw, $g^*$, a change in the position of this collar giving more or less lift to the feed-bar O, and thereby changing the amount of feed at each revolution. The end of the large exhaust-pipe B is provided with a valve, $b^2$, opening outward. When the valve is thus opened the air finds an easier entrance than through the exhaust-mouths, there is but little air enters the latter, and when the valve closes the movement and volume of air is gradually increased through the suction-mouths until the whole amount that is admitted goes through them. A bent lever, P, is so pivoted and arranged that one end engages with the valve $b^2$. The other end, having an inverted-T shape, (thus, ⊥,) is actuated at the proper time by a projection, $h^*$, on the side of the cam-wheel $C^4$ opening the valve by raising the first-mentioned end of the lever by acting upon its lateral arms and depressing the end with the valve, thus opening the valve. The valve and lever are returned to place by means of a spring attached to the valve. This valve is opened as soon as the knives have finished a cut, and is kept open until the suction-mouths are at their extreme outward movement when it is closed. As the said suction-mouths move inward the upper ends of lifter-bars $f'$ and $f^6$ are attached to the bell-crank levers R R' by links $r$ $r$. The upper ends of R R' are attached to the straight knife L by links $r^2$ $r^3$. Projections S S upon the cam-wheel $C^2$ and $C^5$ at the proper time engage with the ⊥-ends of lifter-bars $f'$ and $f^6$, raising them both at the same time, and holding them up a certain time due to the circumferential length of the projections S S, and when the projection passes beyond the center the spiral spring brings the lifter bars and attachments back to their original position. The lifter-bar $f^2$ has a link, $t$, attached to its upper end, and this is attached to the end of the bell-crank T.

Attached to the upper end of said bell-crank is a link, $t'$, the other end of which is attached to the arm $m^2$ of the swinging knife M. The projection $t^3$ on cam-wheel $C^2$ at the proper time engaging the ⊥-end of the lifter-bar $f^2$, raises it and its attachment, and by means of the elbow-crank draws the swinging knife M until the center edge has passed just over the edge of the straight knife L to make the cut, the parts being all brought back to their original position by the spring.

Attached to the upper end of lifter-bar $f^3$ are two links, $u$ $u'$, the upper ends of which are attached to the arms $u^2$ and $u^3$ upon the shafts $u^4$ $u^5$, that by means of the cogged segments I I' and racks $i'$ $i^2$ move the slides $i$ $i$ up and down.

Upon the cam-wheel $C^3$ is a projection that engages at the proper time the ⊥-end of the lifter-bar $f^3$, and through the attachments just described move the slides $i$ $i$ up, a spiral spring bringing the parts back to place again.

Attached to the upper ends of the lifter-bars $f^4$ and $f^5$ are a pair of links, V V, arranged to form a knuckle-joint, the outer ends of which are attached to the levers V near their centers. The lower ends of said levers are pivoted in the forked studs $V^5$. The upper ends engage with projections attached to the ends of the suction-mouths G G', that extend through the slots in the angle-plates J J J. The projections W W' upon cam-wheels $C^3$ and $C^4$ at the proper time engage the ⊥-ends of the lifter-bars $f^4$ and $f^5$, raising them, at the same time pushing upward the attached ends of the knuckle-joints V V, and by then forcing outward the levers V, and by then moving the two suction-mouths outward from the skin and stretcher-bar, the return action being made by the spiral spring on the shafts of the lifter-bars.

To stretch the skin and attach it to the feed apparatus, X X' are flat rods of wood nearly as long as the drum C. From each end of the rods X a strong flexible leather strap extends over the stretcher-bar to the other rod, X'. The straps have holes every two inches. From the rods X and X' straps extend down nearly around the drum C, where they are drawn taut through buckles attached to C, the straps from one rod going around the drum C one way, and from the other going around the opposite way, so as one unwinds or is let out the other is wound up or taken up. The skin is attached to the rods and straps by spring-clasps on tapes, the clasp being caught over the edge of the skin and the attached tapes tied to the rods to give the endwise tautness, and to the straps through the holes to give the sidewise tautness, and are shifted from side to side as the skin passes over the stretcher-bar. Any number of them can be used, as is required to keep the skin flat and smooth over the bar.

The operation of the machine is as follows: The skin is put over the stretcher-bar. The ends of the skin are attached to the rods X and X' by tapes with snap-clasps or any other suitable devices at their ends. The snaps are caught over the edge of the skin and the tapes are tied to the bars, so as to pull the skin taut endwise. Snap-clasps or equivalent fastening devices and tapes are caught over the edge of the sides of the skin and tied to the straps X X, stretching the skin sidewise. As the skin is fed over the stretcher-bar the snap-tapes are shifted as they come near the bar to the other side, and again fastened for the purpose of keeping the skin stretched taut. The exhaust-fan being running, the machine is started, a cut having just been made. The projection upon the cam-wheel $C^3$ engages with the bent lever P and opens the valve $b^2$, allowing the air to enter the exhaust-pipe B, relieving the suction-mouths so but a small amount of air passes in through them. The slides $g\ g\ g\ g$ are adjusted so as to admit the proper amount of air at each part of the skin—that is, where the fur is long a less amount than where it is short, the amount being what will suck down and hold the soft fur, and not enough to draw down the stiff hairs as well. The projection upon the cam-wheel $C^3$ and $C^4$ engages with the lifter-bars $f^4$ and $f^5$ and through the knuckle-joints V V and levers V' push the suction-mouths apart, so that they are clear from the skin and stretcher-bar about one-half an inch. At the same time a pin upon the edge of the large gear-wheel C' engages with the feed-bar O, lifting the feed-bar, and through the pawl $o$ and ratchet-wheel $b'$, shaft $n$ and worm-gear wheels N and $C^2$ moves the skin forward one feed as the shaft E, with the cam-wheels, move on the projections. After passing the highest points the lifter-bars, with their attachments, are drawn back by spiral springs, the lever P, with the valve $b^2$, is released, and the valve closes, and the current of air enters through the mouths G and G'. The projection upon the side of cam-wheel $C^3$ engages the lifter-bar $f^3$, and through the long links $u$ and $u'$, the arms $u^2\ u^3$, shafts $u^4$ and $u^5$, quadrants I I, and racks $i\ i$, the slides are moved upward. As the suction-mouths come toward and against the skin the slides go back to their former position, the two moving volumes of air being graduated by means of the slides $g\ g\ g\ g$, so as to admit the proper quantity of air at each part of the skin to draw down the fur only, leaving the stiff water-hairs standing above the stretcher-bar, while the soft fur is held down by the exhaust-current of air. A slight time is here given before the next movement, so that the operator may see that no fur is left standing above the stretcher-bar. If so, a slight blow of wind from his mouth will bend it down below the action of the knives. The projections upon the cam-wheel $C^2$ and $C^5$ engaging with the lifter-bars $f'$ and $f^6$, and through the links $r\ r$, bell-crank lever R and R', and the links move the straight knife L forward, so that the cutting-edge is exactly over the edge of the stretcher-bar, and holds the knife L in that position until the cut is made. The projection $t^2$ upon the cam-wheel $C^2$ engages with the lifter-bar $f^2$, and through the link $t$ and bell-crank T link $t'$ moves the swinging knife M across the straight knife L, cutting off all the projecting hairs. The projections upon the cam-wheels passing their highest points, the springs bring the two knives back to their former position. The shaft E, with the cam-wheels, having now made one revolution, the same thing is again repeated, the air is admitted into the main pipe, the suction-mouths are drawn apart, the skin is fed forward the proper distance, the valve is closed, so the air is drawn in at the said mouths, the slides move upward and down as the suction-mouths close together, the fur is drawn down and held by the suction-current a moment of rest for observation, the forward movement and rest of the straight knife and the movement of the swinging knife cutting the upright water-hairs, and repeated again and again until the whole skin has been subjected to the same treatment.

As concerns some of the combinations of parts aforesaid any suitable plucking device for grasping and pulling out the hairs may be applied in place of a cutter. Further, in some of the combinations in which a cutter is essential, one differing in form from that herein set forth may be employed. In order, however, to secure upon the whole the best results, the cutter formed and applied for operation as herein set forth is to be used.

I am aware that apparatus has been designed for the purpose of clipping seal and other skins, for clipping or unhairing skins, and for clipping hats, furs, &c., as represented, for example, in the Letters Patent of the United States, Nos. 240,007, 275,077, and 271,423; but all such apparatus heretofore projected are radically different from my invention.

What I claim as my invention is—

1. In a machine for clipping the water-hairs of seal and other skins, the combination of a cutter or cutters, a straining-bar for presenting the hairs to the action of the cutter or cutters, means for straining the skin across said bar, and an exhaust apparatus placed to withdraw air from behind the fur, and thereby depress and hold the fur by simple atmospheric pressure during the operation of the cutter or cutters, all substantially as and for the purpose herein set forth.

2. The combination, with the straining-bar, of the exhaust-pipes constructed with laterally-expanded mouths, the inner lips of which are so proportioned and arranged as to avoid contact with the fur, all substantially as and for the purpose herein set forth.

3. The combination of the exhaust-pipes constructed with laterally-expanded mouths, a straining-bar, the partitions arranged within the said mouths, the perforated partition, and the slides, all substantially as and for the purpose herein set forth.

4. The combination, with the straining-bar, suitable cutting devices, and the exhaust-pipes having laterally-extended mouths, of the movable plates, and means for automatically actuating said plates in unison with the movements of the said exhaust-pipes and cutting devices, all substantially as and for the purpose herein set forth.

5. The combination, with a straining-bar, exhaust-pipes, and cutting mechanism, of the drum, bands, straps, and lateral bands, all substantially as and for the purpose herein set forth.

6. The combination, with a straining-bar and means for straining the skin over or upon the same, of a pivoted oscillating cutter constructed with the angular cutting-edge and a movable counter-blade, all substantially as and for the purpose herein set forth.

7. The method herein described of removing the water-hairs from seal or other skins, which consists in first stretching the skins over a stretching-bar, then depressing and retaining in a depressed position that portion of the fur contiguous to the edges of the bar upon both sides of the latter, by atmospheric pressure induced by suction, and then cutting off or plucking out the stiff hairs which project above the bar, all substantially as and for the purpose herein set forth.

JOHN W. SUTTON.

Witnesses:
 JOHN H. FISHER,
 RUDOLF H. VIGELLMAN.